METHOD OF PRODUCING ELECTRIC CURRENT UTILIZING A
COPPER OXIDE THERMOELECTRIC GENERATOR
Filed March 18, 1968
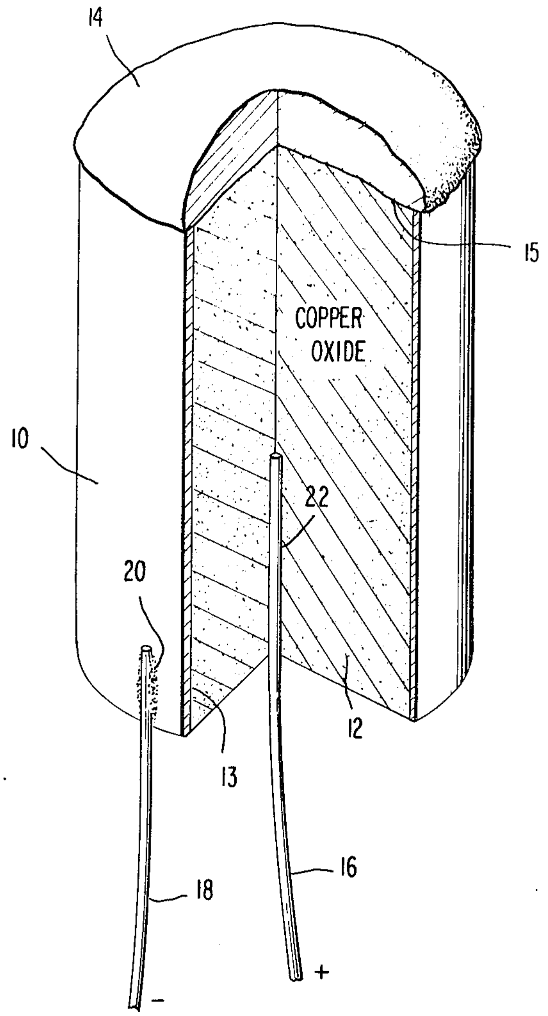
INVENTOR
ARLIN C. LEWIS
BY Sughrue, Rothwell, Mion, Zinn & Macpeak
ATTORNEYS 3,516,871

METHOD OF PRODUCING ELECTRIC CURRENT UTILIZING A COPPER OXIDE THERMOELECTRIC GENERATOR

Arlin C. Lewis, Columbia Falls, Mont., assignor to Gloria B. Lewis, Columbia Falls, Mont.

Filed Mar. 18, 1968, Ser. No. 713,665
Int. Cl. H01r 1/16
U.S. Cl. 136—201 1 Claim

ABSTRACT OF THE DISCLOSURE

A thermo-electric generator that generates an electric current of relatively high density has a copper oxide core within a casing of a dissimilar metal having a sealed end. The copper oxide core is formed within the conductive metal casing by melting pure copper in a highly oxidizing flame and casting it within the casing followed by melting pure copper without oxidation and casting it on the copper oxide core to form a sealing head.

BACKGROUND OF THE INVENTION

Field of the invention

The present invention is directed to a thermally responsive electric generating device of the type broadly referred to as a thermocouple and method of making such a device.

Description of the prior art

In a thermocouple structure a voltage may be developed when dissimilar metal junctions are subject to temperature differential. The voltage is dependent upon the temperature of the junction of the two dissimilar metals and on the particular metals used in the couple.

Thermo-electric generating devices of the type using two dissimilar metals which develop a voltage across their junction are well known in the prior art for the measurement and indication of temperatures. These electrical devices are highly advantageous in that they are relatively inexpensive due to the simple structure involved, and because of their relatively small size and indestructability. The prior art thermocouple devices, however, are only capable of developing a relatively low density current which is sufficient for the operation of temperature control and indicating devices, such as gauges or the like. None of these thermo-electric thermocouple type electric generating units are capable of developing a relatively high density current sufficient for use as a practical source of electricity or for substitution as a battery or the like.

SUMMARY OF THE INVENTION

The thermo-electric generating device of the present invention includes a copper oxide core which is formed within a casing or shell of a dissimilar metal. The copper oxide is formed by exposing pure copper to a highly oxidizing flame and allowing the formed copper oxide to fill the major portion of the internal area of the metallic casing. The copper oxide is sealed within the casing by a metallic head, thereby preventing chemical changes in the copper oxide core as the entire device is exposed to different sources of heat.

The structure of the device is such that it will retain, for a considerable length of time, the heat (or cold) to which it is subjected, thereby allowing the generation of a relatively high density current for a substantial length of time after the source of heat (or cold) has been removed. The thermocouple junction of dissimilar metals is formed by the copper oxide core in intimate contact with the internal walls of the casing and sealing cap of a dissimilar metal to produce a relatively high density current when exposed to a temperature differential.

The device of the present invention has the additional advantages of being very inexpensive to produce, due to its simple structure and the common materials used in its manufacture. The structure of the device renders it almost indestructible and also provides an indefinite shelf life. The generating units may be activated by applying heat from almost any source to the metallic covering or sealing head of the generator. Heat sources may include directing sunlight onto the device by means of a magnifying glass.

BRIEF DESCRIPTION OF THE DRAWING

Additional features other than the above advantages of the invention will be apparent from the following, more particular description of the preferred embodiment of the invention, as illustrated in the accompanying drawing in which:

The sole figure is a perspective view of the device with a cutaway portion showing the interior of the core and its relation to the shell and sealing cap.

DESCRIPTION OF THE PREFERRED EMBODIMENT

The thermo-electric generating device of the present invention comprises an outer cylindrical shell or casing 10 made from an electrical conductive metallic material formed into a tubular shape. A copper oxide core 12 formed within the casing 10 and arranged to substantially fill the entire interior area so as to be in intimate electrically conductive contact with the internal walls 13 of the shell 10. The upper portion of the casing is filled with a metallic sealing head 14, which is flush with the top of both the copper oxide core 12 and the outer shell 10. The sealing head 14 is made from a metallic conductive material of the same type as that used in forming the cylindrical shell 10. The sealing head 14 is arranged so as to completely seal the upper portion 15 of the copper oxide core 12 within the casing 10, thereby prohibiting exposure of the core 12 to various sources of heat to which the generating device is subjected. Exposure of the copper oxide core 12 to the various sources of heat could possibly cause chemical changes in the copper oxide which would render the device useless. An electrical conductor or lead 16 is embedded within the copper oxide core so that the end of the embedded portion of the conductor reaches to at least the center of the core. A second conductor or lead 18 is attached to the outer surface 20 of the casing 10.

Through experimentation it was found that various types of metals dissimilar to copper oxide could be used for the outer casing or shell 10 to provide a workable thermoelectric generating device. However, the metals of copper and tungsten produced by far better results than any of the other metals tested.

The size of the device may vary within certain limits while the preferred embodiment has a length of approximately ¼ of an inch and a diameter of the metallic casing 10 of ⅛ of an inch. It is important to note, however, that while the length of the device may be varied within reason, the diameter of the tube should not exceed ⅛ of an inch. The advantage of a larger size is that it will retain heat for a longer period and, consequently, the generator will produce current for a longer period of time after the heat source has been removed. Of course, the accompanying slight disadvantage would be the longer period necessary to heat the generating device electrical output, in terms of current density, does not increase by size. Consequently, the diameter of the outer casing 10 could be less than ⅛ of an inch.

The means of producing the copper oxide core is extremely important for proper performance of the thermal generating device.

To form the device a conductive metallic tubing 10 having a diameter of ⅛ of an inch or less and a desired length is arranged with the electrical conductor or lead 16 such that the lead is placed within the tube as near to the center as possible. Care should be taken not to extend the lead 16 more than halfway through the tube 10 and it should not come in contact with the internal walls of the tube. A piece of copper wire or other pure copper material is arranged directly over the top of the tube and is exposed to a highly oxidized flame. In forming the copper oxide core it is important that a highly oxidizing type of flame be used. Experimentation has shown that the flame which works most successfully is a cutting torch flame using oxygen and propane gas. The copper material is allowed to melt slowly for complete oxidation to take place and the formed copper oxide drips into the tubing 10 and around the end of the lead 16 inside the tube 10. The tube or casing 10 is filled almost completely with the copper oxide core 12. After forming of the core a suitable nonoxidizing flame or other source of heat is used to melt a conductive metal onto the top portion of the copper oxide core, so as to provide a sealing head 14. As pointed out above, the sealing head is in intimate contact with both the upper surface portion 15 of the copper oxide core 12 and the metallic tubing 10.

A second electrical conductor or lead 18 is attached to the outside of the casing 10 by welding or the like. It is important to point out that in attaching the lead wih a flame or in any other use of a flame or other source of heat in relation to the thermal electric device, the flame should not come in contact with the copper oxide core. Any interaction between a flame or other source of heat with the copper oxide core could result in a chemical reaction of the copper oxide which could render the device useless.

As stated above, the metallic tube 10 and sealing head 14 can be made of either tungsten or copper for best results. While either tungsten or copper could be used both the casing 10 and the sealing head 14 should be of the same material on the same thermal generating device.

One small thermo-electric generator constructed in accordance with invention was heated on its sealed end 14 until cherry red with leads 16 and 18 connected to the positive and negative posts of a milliampmeter produced 400 milliamps at .2 volt.

Additional current may, of course, be made available by connecting a number of these generators in series. For example, three of the units were connected in series and produced a sufficient enough current to operate a six transistor radio.

In the description of the preferred embodiment above reference was made to generating current by exposure of the device to a heat source, thereby raising the temperature of the thermo-electric junction and causing a voltage between the copper oxide core and the outer metal conductive casing 10. The thermo-generating device of the present invention can generate a relatively high density current by exposure to extremely low temperatures.

While as a practical feature the thermal generating device would more often be used in combination with a high temperature heat source, the ability to produce a relatively high density current by lowering the temperature of the device, for example, as to liquid oxygen, would lend increased versatility to the thermo-electric generating device of the present invention.

While the invention has been particularly shown and described with reference to a preferred embodiment thereof, it is understood by those skilled in the art that various changes in form and details may be made therein without departing from the spirit and scope of the invention as defined in the following claim.

What is claimed is:

1. A method of producing a high density electric current utilizing a thermo-electric generator comprising: an outer tubular casing of copper having a maximum diameter of approximately ⅛ inch, a copper oxide core cast within the casing, the core being in intimate electrical contact with a major portion of the inner surface of the casing, a sealing head of copper in intimate electrical contact with one end of the casing and the core, the head thereby sealing one end of the core within the casing so that the core is protected from direct exposure when the head is subjected directly to a source of thermal energy, a first copper conductor embedded within the core and a second conductor attached to the casing comprising applying heat to said sealing head and withdrawing current from said first and second conductors.

References Cited

UNITED STATES PATENTS

| | | | |
|---|---|---|---|
| 1,526,139 | 2/1925 | Grondahl | 136—89 X |
| 1,842,360 | 1/1932 | Kahler. | |
| 2,766,440 | 10/1956 | Marsden | 136—228 |
| 2,805,272 | 9/1957 | Postal | 136—228 |
| 3,100,163 | 8/1963 | Lyons. | |
| 3,281,921 | 11/1966 | Danko et al. | 136—201 |
| 3,285,786 | 11/1966 | Katz | 136—205 |

OTHER REFERENCES

Kiukkola et al. "J. Electrochemical Soc.," vol. 104, No. 6; June 1957, pp. 379–85, 136–236. Copy in Group 110.

Bidwell, C. C. "Physical Review," vol. 3 (2nd Ser.) February 1914, pp. 204–216, 136—238. Copy in Group 110.

JOHN H. MACK, Primary Examiner

A. BEKELMAN, Assistant Examiner

U.S. Cl. X.R.

136—83, 86, 205, 228, 238, 241